United States Patent [19]

Barker et al.

[11] 4,001,112
[45] Jan. 4, 1977

[54] METHOD OF OPERATING A CHROMATOGRAPHIC APPARATUS

[76] Inventors: Philip Edwin Barker, Eastern Road, Selly Park, Birmingham 29; Ronald Edward Deeble, 16 Brentford Road, Solihull, both of England

[22] Filed: Dec. 22, 1975

[21] Appl. No.: 643,022

Related U.S. Application Data

[63] Continuation of Ser. No. 368,584, June 11, 1973, abandoned.

[30] Foreign Application Priority Data

June 14, 1972 United Kingdom ............ 27786/72

[52] U.S. Cl. .................................. 210/31 C; 55/67
[51] Int. Cl.² ......................................... B01D 15/08
[58] Field of Search ...................... 55/67, 197, 380; 210/139–141, 31 C, 198 C

[56] References Cited

UNITED STATES PATENTS

| | | | |
|---|---|---|---|
| 3,698,156 | 10/1972 | Dirian .................................... | 55/67 |
| 3,701,609 | 10/1972 | Bailey ............................ | 210/198 C |
| 3,926,589 | 12/1973 | Klementi et al. ...................... | 55/67 |

*Primary Examiner*—John Adee
*Attorney, Agent, or Firm*—Wenderoth, Lind & Ponack

[57] ABSTRACT

The invention provides a method of operating a chromatographic apparatus for separating a fluid mixture. The apparatus has a plurality of compartments containing a chromatographic packing, conduit means interconnecting the compartments in at least one closed loop series, isolating valves in said conduits for isolating each compartment from the remaining compartments, and, for each compartment, a valved purge fluid inlet, a valved purge fluid outlet, a valved carrier fluid inlet, a valved carrier fluid outlet, and a valved fluid mixture inlet. The valved fluid mixture inlet is adapted to be coupled to a source of a fluid mixture to be separated chromatographically. The isolating valves are sequentially operated for successively isolating the compartments from the other compartments at least one at a time in one direction around the loop, and the valves of the purge fluid inlets and the purge fluid outlets for the isolated compartments are appropriately opened to allow purge fluid to pass through one or more thereof. The purge fluid inlet and purge fluid outlet of each compartment are closed when the corresponding compartment is in communication with the other compartments.

5 Claims, 6 Drawing Figures

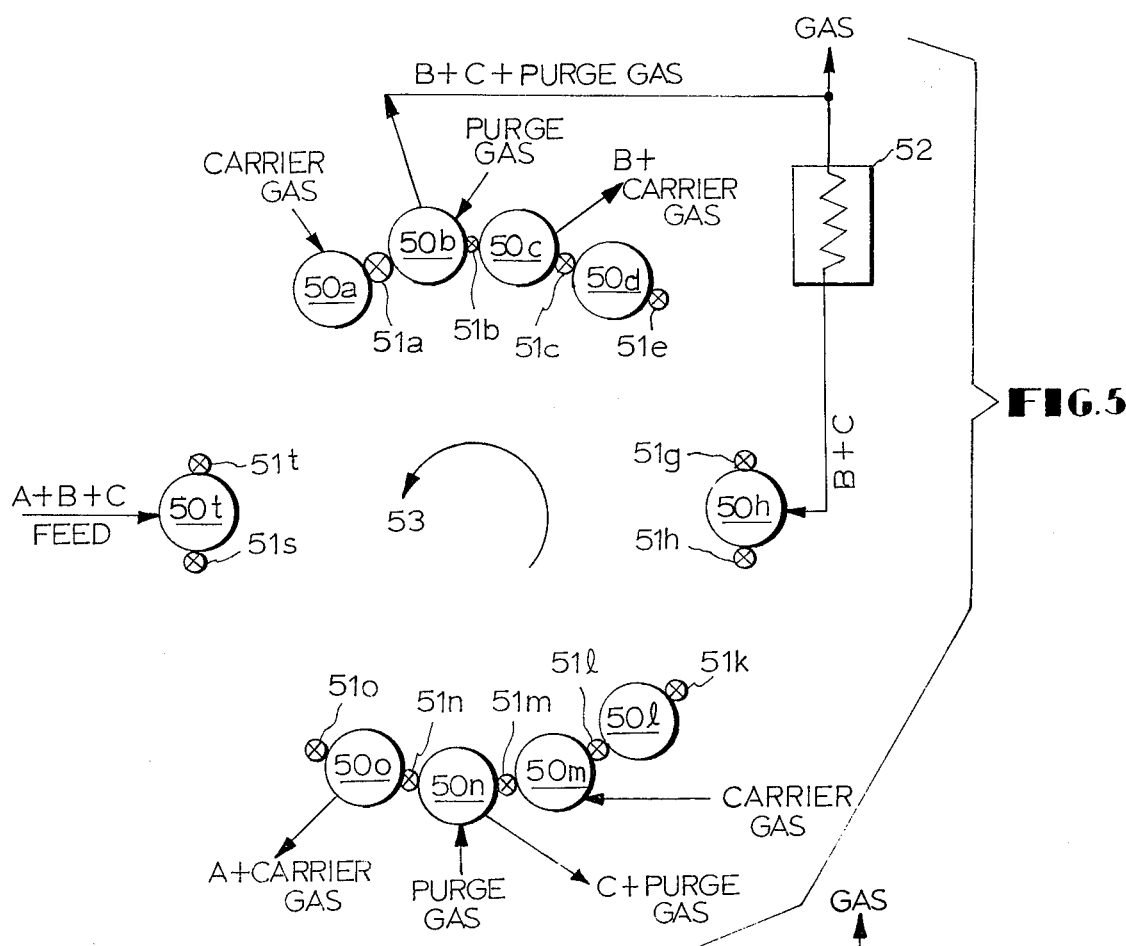
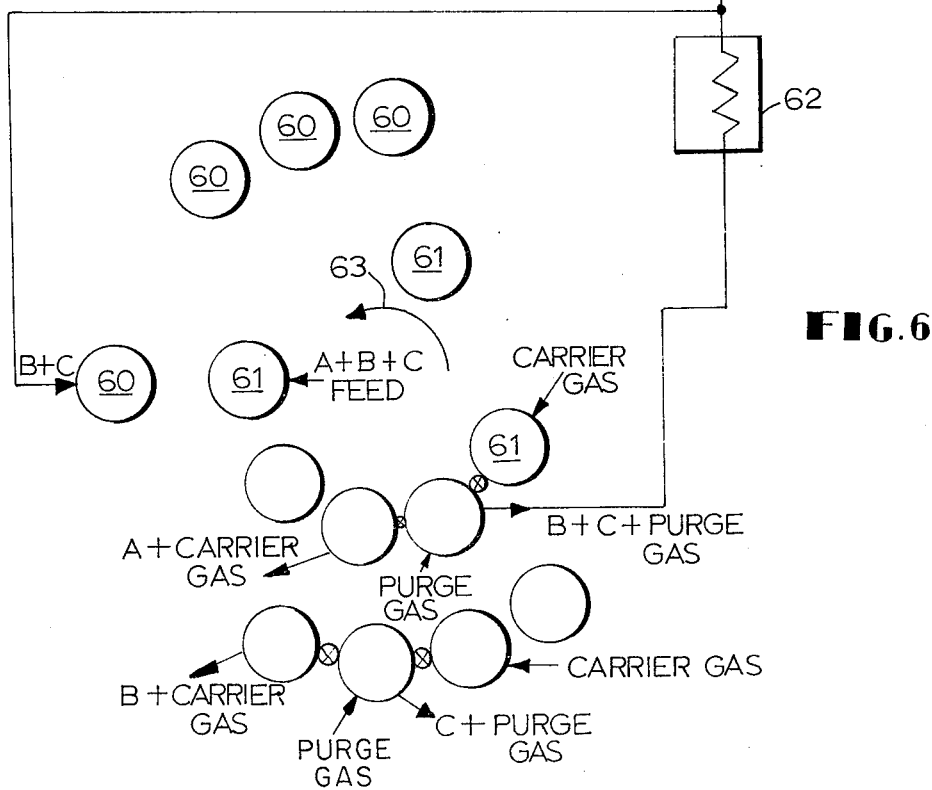

METHOD OF OPERATING A CHROMATOGRAPHIC APPARATUS

This application is a continuation of our U.S. patent application Ser. No. 368,584 filed June 11, 1973, now abandoned.

This invention relates to a method of operating a chromatographic apparatus for the separation of mixtures of fluids, i.e. gases or liquids.

According to the invention, there is provided a method of operating a chromatographic apparatus for separating a fluid mixture, the apparatus having a plurality of compartments containing a chromatographic packing, conduit means interconnecting the compartments to provide a closed loop series, a valve in each conduit for isolating each compartment from the remaining compartments, a valve controlled fluid inlet and outlet for each compartment, and means for sequential operation of the valves. The valves are operated by said means so that, in use, (i) each compartment in turn is isolated and treated with a purge fluid to remove one or more fractions of a fluid mixture; (ii) each compartment in turn is fed with a fluid mixture to be separated; (iii) each compartment in turn is fed with a carrier fluid; and (iv) carrier fluid is removed from each compartment in turn, the sequential operation being such that, in use and at any instant, the compartment which is fed with the fluid mixture to be separated is a compartment through which the carrier fluid passes between the compartments which are respectively fed with, and bled of, carrier fluid, and the direction of the valve sequencing around the closed loop series is in the same sense as the movement of the carrier fluid therethrough.

The valve controlled fluid inlet and outlet for each compartment may take the form of a single inlet which, at different times, may be fed either by carrier fluid or purge fluid, and a single outlet for said fluids. Alternatively, there may be provided separate valve controlled fluid inlets and outlets for the carrier fluid and the purge fluid.

Preferably, distribution means are provided for respectively distributing the fluid mixture to be separated, the carrier fluid and the purge fluid to all of the compartments, the distribution means preferably being such that the ducts between any one distributor and the compartments are the same length for all of the compartments.

Preferably, also, the compartments are in the form of tubes which are spaced side-by side with their axes parallel and are joined alternately at their ends by the conduits so as to define the closed loop series.

The tubes may be disposed with their axes in a vertical or horizontal plane, preferably around the periphery of a rectangle or in angularly spaced relationship on the circumference of a circle. More than one closed loop series may be provided, with a separated fraction of the fluid mixture from one series being passed, in use, into another closed loop series for further separation.

Alternatively and/or additionally, the valve sequencing means may be arranged to close selected isolating valves which are spaced apart around the series or around each series where there is more than one so that, at any instant, parts of the series or parts of each series are isolated from one another, closure of such isolating valves being sequenced around the series or around each series so that several separating operations can be effected in the apparatus. In such cases, the number of each of the valve controlled fluid mixture inlets, the valve controlled carrier fluid outlets and the valve controlled purge fluid outlets from each compartment will be equal to the number of separating operations to be effected in the closed loop series or each closed loop series, but the number of purge fluid and carrier fluid inlets preferably remains one each per compartment. In this manner, separation of a multi-component mixture can be effected by passing a separated fraction of the fluid mixture from one isolated part of the closed loop series to another for further separation.

The method of operating the apparatus according to the invention has the advantage that complicated sliding seals (which have been used in previous apparatus) are not required, and that readily available valves can be employed for controlling the flow of the various fluids in the apparatus. Furthermore, the isolation of the compartments for purging purposes enables purge fluid, which may be the same as the carrier fluid, to be passed through at a much higher pressure than the pressure at which the carrier fluid is passed through the apparatus, thus enhancing the efficiency of the purging action. It is preferred that the valves used in the apparatus be such as to give a very positive seal to ensure that they are closed against flow in both directions. It may also be advantageous to provide means to enable part of the whole of the column to be maintained at an elevated temperature.

An embodiment of the present invention will now be described, by way of example, with reference to the accompanying drawings, in which.

Figure 1:
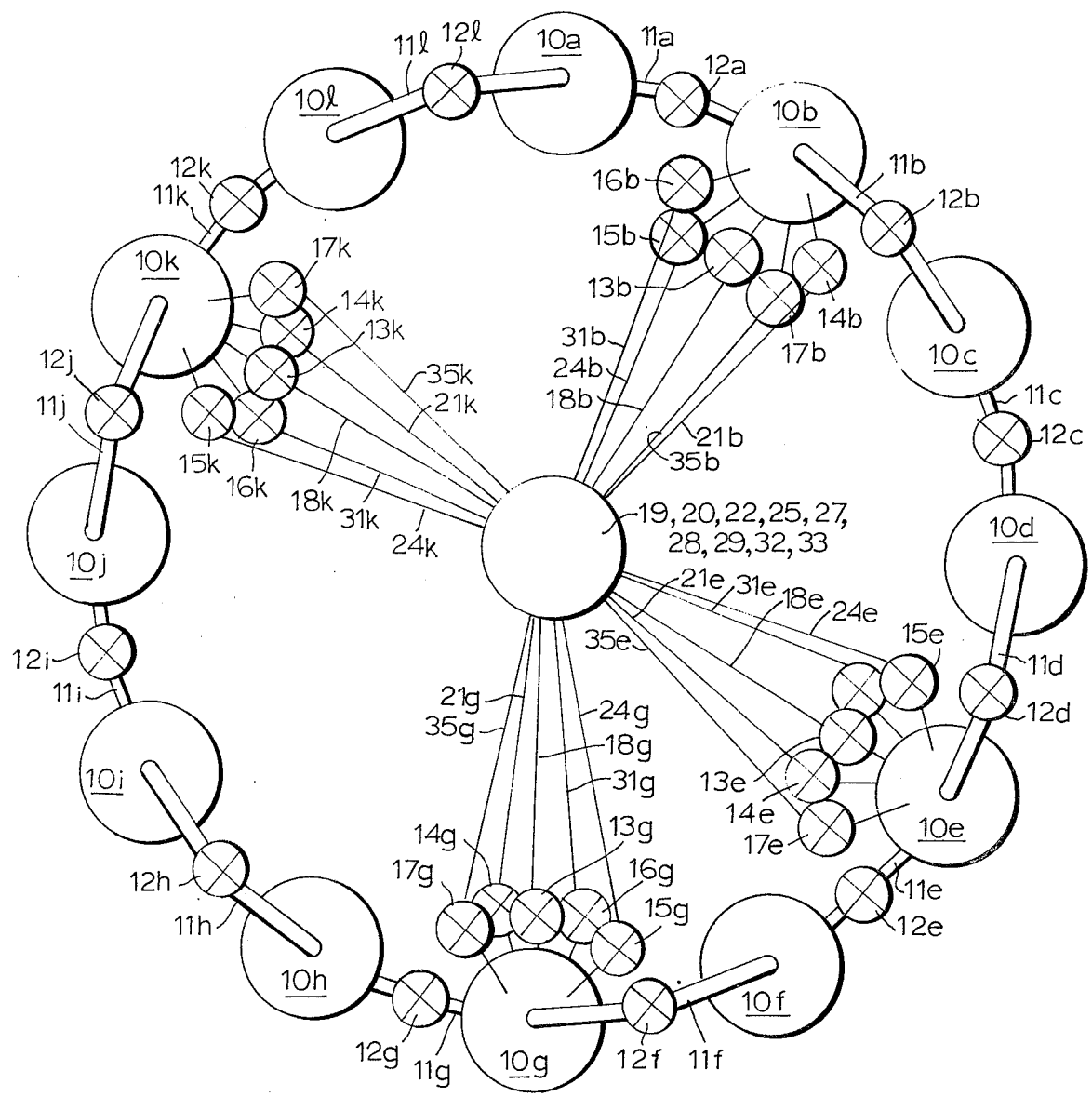
FIG. 1 is a schematic underside view of a chromatographic apparatus with which the method according to the present invention is carried out.
Figure 2:
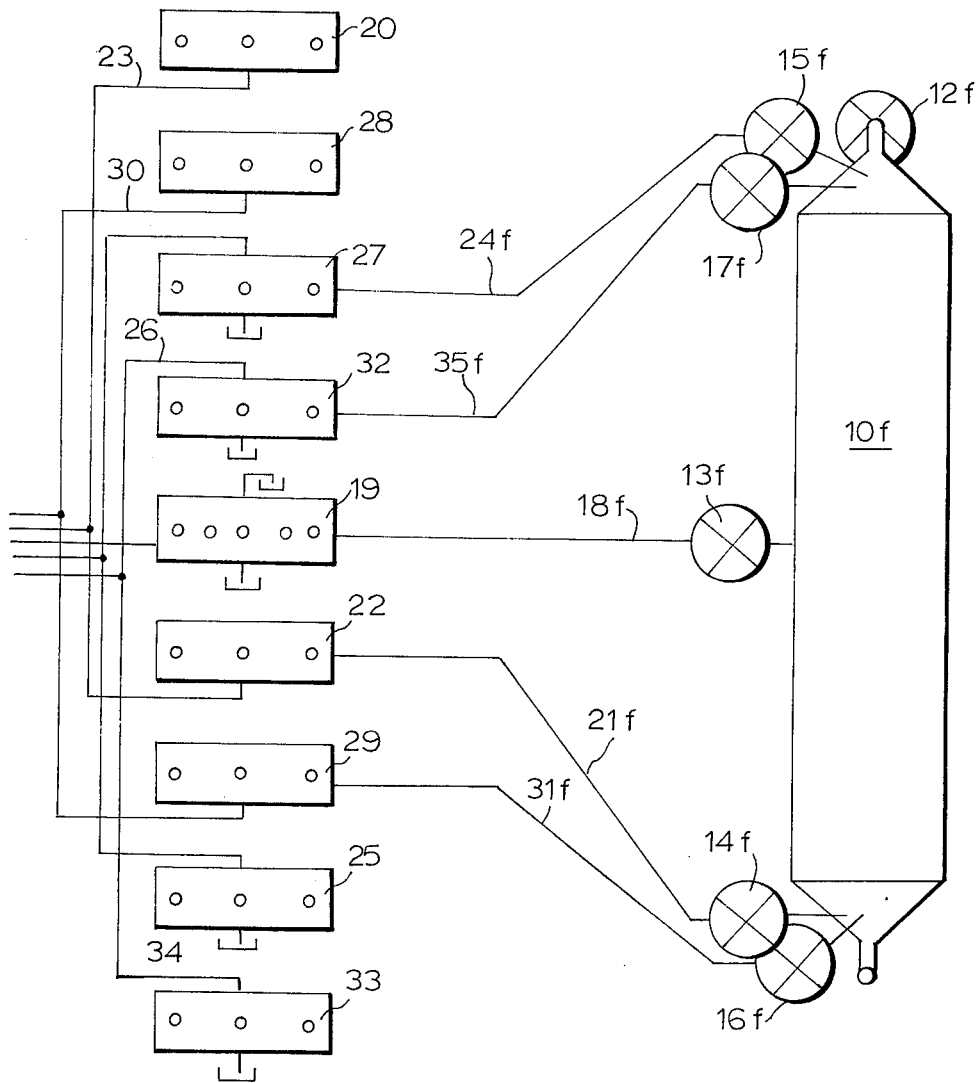
FIG. 2 is a schematic elevation of the apparatus of FIG. 2 showing the connections between distributors and a single compartment.

FIG. 5 is a schematic diagram of an apparatus similar to that of FIGS. 1 and 2, but adapted to separate a three component mixture in a single closed loop series employing a gaseous carrier fluid and a gaseous purge fluid, and FIG. 6 is a schematic diagram of an apparatus similar to that of FIG. 1, but provided with two closed loop series adapted to separate a three component mixture, employing a gaseous carrier fluid and a gaseous purge fluid.

In the following description, the various compartments and valves are designated by a reference numeral plus a letter from $a$ to $l$. It should be understood that these numbers refer to parts of the apparatus which are the same for the various compartments 10, the letter designating which of the compartments the part is related to. For example, valves 13$e$, 14$e$ and 15$e$ are related to compartment 10$e$. However, because the drawings are schematic, parts are referred to by reference number and letter in the specification which do not appear in the drawings.

Referring now to FIGS. 1 and 2, the separation apparatus comprises a closed loop series containing a solid packing and constituted by a plurality of, in this embodiment twelve, compartments in the form of tubes 10a to 10l joined together by conduits 11a to 11l. The tubes 10a to 10l are disposed with their axes vertical around the circumference of a circle and the conduits 11a to 11l connect ends of adjacent tubes 10a to 10l together so as to define a sinuous, closed loop series extending around the circumference of the circle. Diaphragm type solenoid valves 12a to 12l are provided for conduits 11a to 11l, respectively. The solenoid valves 12a to 12l can be closed to isolate any one or more of the tubes from the remaining tubes. High pressure from a line (not shown) acts on the diaphragm to close each valve 12a to 12l when the solenoid thereof is energized.

Each tube 10a to 10l is provided with five normally closed valves 13a to 13l, 14a to 14l, 15a to 15l, 16a to 16l and 17a to 17l, respectively. The valves 13a to 13l are located in inlets which enter the tubes 10a to 10l respectively midway between the ends of each tube, and serve to control the feed of a fluid mixture to be separated along ducts 18a to 18l connecting the tubes 10a to 10l and a distributor 19 disposed at the center of the aforesaid circle. Distributors (not shown) are provided in the tubes 10a to 10l for distributing the fluid mixture across the area of the solid packing within the tubes. The other valves 14a to 14l, 15a to 15l, 16a to 16l and 17a to 17l control inlets and outlets disposed at the ends of the tubes 10a to 10l, the arrangement being such that, for each set of valves, each valve is disposed at the opposite end of its associated tube from the corresponding valve associated with the end of an immediately adjacent tube. Thus, for example, as shown in FIG. 2, valve 14f is disposed at the bottom of tube 10f, while valves 14e and 14g are disposed at the top of their respective tubes 10e and 10g. Thus, alternate valves 14a, 14c, 14e, 14g, 14i and 14k are disposed at the tops of their respective tubes, while remaining valves 14b, 14d, 14f, 14h, 14j and 14l are disposed at the bottoms of their respective tubes. The valves 16a to 16l are similarly arranged, while the valves 15a to 15l and 17a to 17l are arranged in the opposite sense so that valves 15a, 17a, 15c, 17c, 15e, 17e, 15g, 17g, 15i, 17i, 15k and 17k are disposed at the bottoms of their respective tubes, the remaining valves of the sets being disposed at the tops of their respective tubes. Valves 14a, 14c, 14e, 14g, 14i and 14k control flow of carrier fluid from a distributor 20 via ducts 21a, 21c, 21e, 21g, 21i and 21k to the tops of their respective tubes. A further carrier fluid distributor 22 is linked to the carrier fluid distributor 20 via a duct 23 and is connected with the bottoms of tubes 10b, 10d, 10f, 10h, 10j and 10l by ducts 21b, 21d, 21f, 21h, 21j and 21l controlled by valves 14b, 14d, 14f, 14h, 14j and 14l, respectively. Valves 15a, 15c, 15e, 15g, 15i and 15k located at the bottom of tubes 10a, 10c, 10e, 10g, 10i and 10k control flow of carrier fluid therefrom by ways of ducts 24a, 24c, 24e, 24g, 24i and 24k leading to a collector 25 which is connected via a duct 26 with a further collector 27 receiving carrier fluid from ducts 24b, 24d, 24f, 24h, 24j and 24l controlled by valves 15b, 15d, 15f, 15h, 15j and 15l located at the tops of tubes 10b, 10d, 10f, 10h, 10j and 10l. Further distributors 28 and 29 are linked by a duct 30 so as to supply a purge fluid to the tubes 10a to 10l by way of ducts 31a, 31c, 31e, 31g, 31i and 31k and ducts 31b, 31d, 31f, 31h, 31j and 31l, respectively, via valves 16a, 16c, 16e, 16g, 16i and 16k and valves 16b, 16d, 16f, 16h, 16j and 16l, respectively. Further collectors 32 and 33 are connected by duct 34 and serve to collect purge fluid from tubes 10a to 10l via ducts 35a, 35c, 35e, 35g, 35i and 35k and ducts 35b, 35d, 35f, 35h, 35j and 35l, respectively, under the control of valves 17a, 17c, 17e, 17g, 17i and 17k, and valves 17b, 17d, 17f, 17h, 17j and 17l, respectively. The lengths of the ducts in each set associated with each distributor or collector are equal so that uniform resistance to flow prevails over the whole closed loop series.

Figure 3:
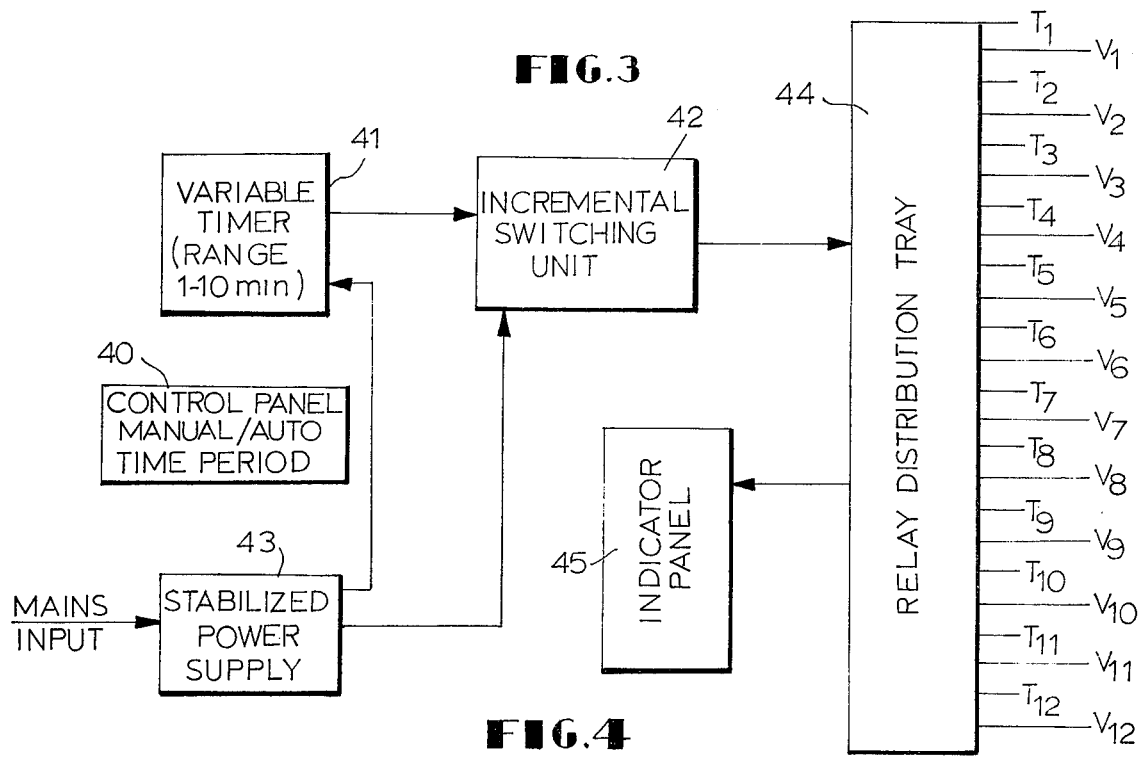
FIG. 3 is a block diagram of a valve sequencing mechanism for controlling the operation of the valves in the apparatus illustrated in FIGS. 1 and 2.

The above-mentioned sets of valves, 12, 13, 14, 15, 16 and 17 are arranged to be operated in a sequence to be described hereinafter by means of a valve sequencing mechanism diagrammatically illustrated in FIG. 3. The mechanism comprises control panel 40, which can be manual, automatic or a combination of both, controlling a timer 41 which is arranged to pass a signal, when energized, to an incremental switching unit 42. The timer 41 can be varied so that the time signals can be varied, for example, between 1 and 10 minutes. A stabilized power supply 43 fed by a mains input supplies stabilized power to the timer 41 and the switching unit 42. The incremental switching unit 42 is connected with a relay distribution tray 44 having two rows of terminals $T_1$ to $T_{12}$ and $V_1$ to $V_{12}$ at a time. Thus, the switching unit 42 can energize terminals $T_{12}$, $T_1$ and $V_1$ are energized. After a further predetermined time interval determined by timer 41, the switching unit 42 deenergizes terminals $T_1$ and $V_2$ and energizes terminals $T_3$ and $V_3$ so that terminals $T_2$, $T_3$, and $V_3$ are energized, and so on until the complete cycle is completed. Repetition of the cycle continues automatically.

An indicator panel 45 fed by signals from the relay distribution tray 44 provides an instantaneous indication of the terminals of the tray 44 which are energized.

The terminals $T_1$ to $T_{12}$ and $V_1$ to $V_{12}$ are arranged to energize the various sets of valves 12, 13, 14, 15, 16 and 17 in accordance with the table set out below:

| Terminal Selected | $T_1$ | $T_2$ | $T_3$ | $T_4$ | $T_5$ | $T_6$ | $T_7$ | $T_8$ | $T_9$ | $T_{10}$ | $T_{11}$ | $T_{12}$ |
|---|---|---|---|---|---|---|---|---|---|---|---|---|
| Valves energized | 12a | 12b | 12c | 12d | 12e | 12f | 12g | 12h | 12i | 12j | 12k | 12l |
| Terminal Selected | $V_1$ | $V_2$ | $V_3$ | $V_4$ | $V_5$ | $V_6$ | $V_7$ | $V_8$ | $V_9$ | $V_{10}$ | $V_{11}$ | $V_{12}$ |
| Valves Energized | 16a | 16b | 16c | 16d | 16e | 16f | 16g | 16h | 16i | 16j | 16k | 16l |
| | 17a | 17b | 17c | 17d | 17e | 17f | 17g | 17h | 17i | 17j | 17k | 17l |
| | 14b | 14c | 14d | 14e | 14f | 14g | 14h | 14i | 14j | 14k | 14l | 14a |
| | 15l | 15a | 15b | 15c | 15d | 15e | 15f | 15g | 15h | 15i | 15j | 15k |
| | 13g | 13h | 13i | 13j | 13k | 13l | 13a | 13b | 13c | 13d | 13e | 13f |

As described previously, the valves of the set 12 are normally open valves, while the valves of the sets 13, 14, 15, 16 and 17 are normally closed valves.

Figure 4:
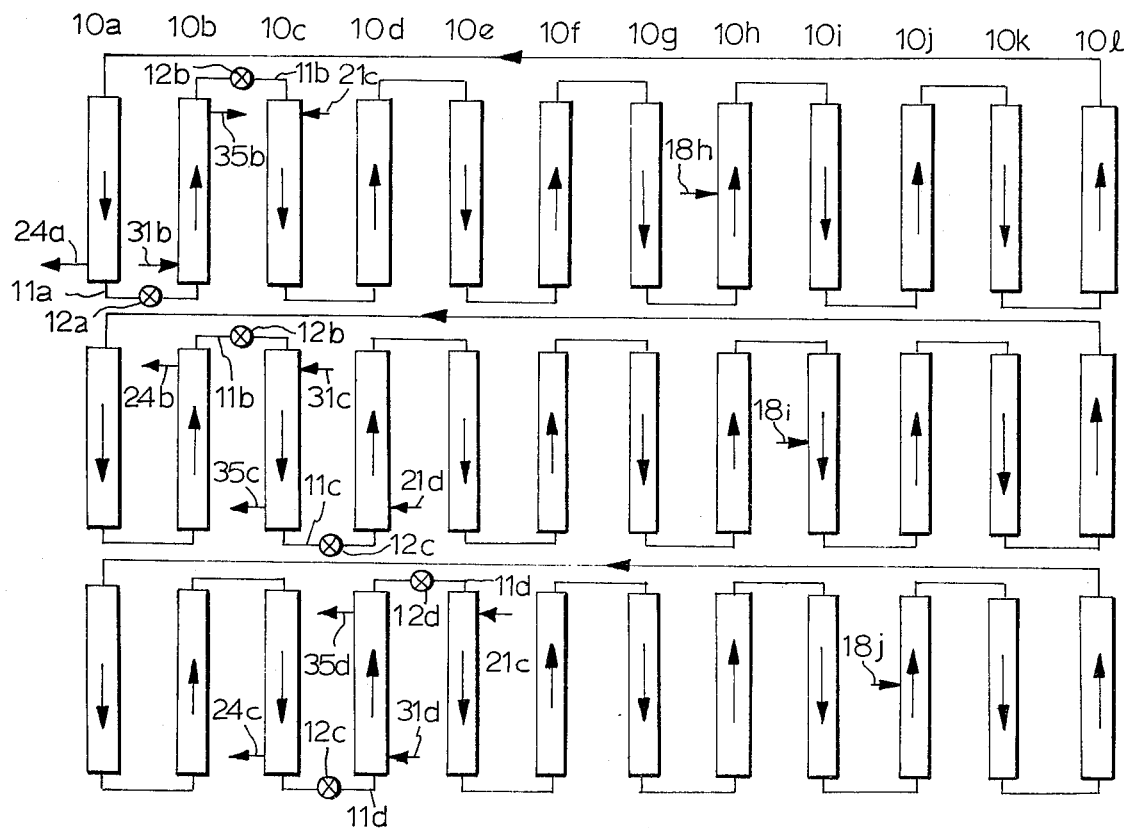
FIG. 4 shows schematically the condition of the valves in the apparatus of FIGS. 1 and 2, after three equal time intervals.

Referring now to FIG. 4, the three rows of tubes 10 diagrammatically set out therein represent the conditions existing within the closed loop series at the times when terminals $T_1$, $T_2$ and $V_2$; terminals $T_2$, $T_3$ and $V_3$; and terminals $T_3$, $T_4$ and $V_4$ are energized, respectively. Taking the first row of columns 10 shown in FIG. 4, energization of terminals $T_1$, $T_2$, $V_2$ causes valves 12a and 12b to be closed, thereby isolating tube 10b from the remaining tubes. At the same time, valve 13h is opened so as to admit a fluid mixture to be separated into tube 10h via duct 18h. Simultaneously, valve 14c is opened to allow carrier fluid to pass via duct 21c into the top of tube 10c, and carrier fluid together with a faster moving component of the fluid mixture is removed from tube 10a via duct 24a and energized valve 15a. Also, valves 16b and 17b are energized, thereby permitting purge fluid to pass through duct 31b and into the bottom of tube 10b so as to strip a slower moving component of the fluid mixture from the packing within the tube 10b, whereby purge fluid together with the slower moving component passes out of tube 10b via duct 35b and energized valve 17b.

After a predetermined time interval which is determined by the variable timer 41, terminals $T_3$ and $V_3$ are energized while terminal $T_1$ is deenergized so that terminals $T_2$, $T_3$ and $V_3$ remain energized and thus isolate tube 10c from the remaining tubes, to allow fluid mixture to be separated to pass into tube 10i, to allow carrier fluid to be admitted into tube 10d, to allow carrier fluid together with faster moving component to be removed from tube 10b, and to allow tube 10c to be purged with purge fluid, whereby the slower moving component is removed therefrom. It will thus be seen that the valve sequencing mechanism sequentially operates the various sets of valves around the series in the same direction as the direction of movement of the carrier fluid around the series. The sequential operation of the valve simulates rotation of the closed loop series in a direction conter-current to the direction of movement of the carrier fluid. Separation occurs when the relative rates of flow of the fluid mixture to be separated and the carrier fluid, together with the rate of 'apparent rotation' of the closed loop series are adjusted with respect to the relative retention of the two fractions of the mixture to be separated so that the rate of 'apparent rotation' of the stationary, packed series is slower than the faster moving fraction, but not slower than the slower moving fractions.

It will also be appreciated that the isolation of each tube 10 in turn from the remaining tubes 10 enables purge fluid to be passed through the isolated tube at a much higher rate than would otherwise be possible, thus improving the efficiency of removal of the slower moving component from the packing within the isolated tube. Furthermore, the elimination of complicated and relatively unreliable, multi-port rotary valves can be achieved.

Mechanical or electrical means for detecting the breakdown of a valve operating mechanism, which can, for example, be a solenoid, are desirable so that a defective mechanism may be detected and replaced.

It will be appreciated that the above-described construction is only capable of separating or resolving a fluid mixture into two fractions or into two parts of different composition, although side streams could be taken from any tube situated between the feed point and the two main offtake points. In the latter case, side streams would be less pure than the streams taken from the two main offtake points, but such side streams could enable a fraction of a higher concentration than in the feed to be collected. If it is desired to separate or resolve a fluid mixture into more than two fractions, for example three fractions, the arrangement of FIG. 5 or FIG. 6 can be employed.

Referring firstly to FIG. 5, the apparatus is very similar to the apparatus of FIGS. 1 and 2 in that a single closed loop series defined by an even number of packed tubes interconnected by valve controlled conduits is provided. In the present embodiment, however, instead of providing one feed mixture inlet, one purge fluid outlet and one carrier fluid outlet for each tube, two of each are provided for each tube and two feed mixture distributors and eight collectors are provided (not shown), four collectors for purge fluid and four collectors for carrier fluid. The closed loop series is constituted in this embodiment by $x$ tubes 50a, 50b . . . 50x connected together in the manner of tubes 10 of FIG. 1 by conduits controlled by normally open solenoid valves 51a, 51b . . . 51x corresponding to valves 12 of FIG. 1. The valves sequencing method diagrammatically illustrated in FIG. 4 is arranged so that, at any one time, the closed loop series is divided into two equal separate parts. Furthermore, the mechanism also isolates a tube in each separate part of the series for purging purposes. The arrow 53 in FIG. 5 indicates the direction of sequential switching of the valves and the direction of movement of the carrier fluid through the respective parts of the series (which is in the opposite sense to that illustrated in FIGS. 1 to 4). At the instant illustrated in FIG. 5, valves 51a and 51b and valves 51n and 51m are closed to isolate tubes 51b and 50n from the remaining tubes in their respective series parts. Closure of valves 51b and 51n serves to define the two aforesaid separate parts of the series. At this instant, a feed fluid mixture A+B+C or a multicomponent mixture to be separated into three parts is being fed to tube 50t, A being the fastest moving component, B being the next, and C being the slowest moving component. Carrier fluid is being fed into tubes 50a and 50m and purge fluid is being fed into tubes 50b and 50n at the same instant. Purge fluid mixed with a B+C component passes out of tube 50b through a heat exchanger 52 where purge fluid is removed and the B+C component is fed into the tube 50h. Component B is removed from tube 50c together with carrier fluid and component C is removed from tube 50n together with purge fluid. It is to be appreciated that different feed mixture distributors are employed for feeding A+B+C and B+C into the respective parts of the column, and that different collectors are provided for the purge fluid outlets and for the carrier fluid outlets of the respective parts of the column.

It is to be appreciated further that after a complete cycle of the valves sequencing mechanism, the whole of the series will have been employed for each of the two separation steps, namely the separation of A from B and C and the separation of B from C.

The number of tubes employed and the lengths of the respective isolated parts of the series can be selected to suit the properties of the mixture to be separated. Furthermore, if desired, the series may be divided into more than two parts, and the number of fluid mixture inlets, carrier fluid outlets and purge fluid outlets in each tube being correspondingly increased.

In the embodiment carried out with the apparatus illustrated in FIG. 6 (which could also be used in a process involving two different chromatographic packings) two concentric closed loop series are used. The outer series includes tubes 60 and the inner series includes tubes 61. Each series is identical to the series of FIG. 1 and the arrangement is such that a feed gas mixture A+B+C is fed into the inner series where A is separated from a slower B+C component which is fed into the outer series after passing through a heat exchanger 62, to separate it from purge fluid. In the outer series the B component is separated from the slower moving C component. The direction of movement of carrier fluids and direction of valves sequencing is given by the arrow 63.

The method carried out by the arrangement of FIG. 6 has the advantage over that of FIG. 5 in that the rates of valve sequencing of the respective series can be varied independently of one another.

In a modification, a multistage separation operation as described with reference to FIG. 5 may be effected in each of the series illustrated in FIG. 6. The number of series may also be varied to suit requirements.

Baffles may be provided in the tubes so as to modify the flow therethrough. In the place of tubes of circular cross-section, tubes of any desired form may be employed. It is within the scope of the invention to purge more than one tube in each series at any instant, and reference herein to 'compartments' should be construed accordingly. It will also be appreciated that when two or more adjacent tubes are isolated at any one time from the remaining tubes, purge fluid may be passed independently through one or more thereof, or purge fluid may be passed serially through two or more adjacent isolated tubes.

The arrangements of FIGS. 5 and 6 have been described in relation to a gas mixture/gas purge arrangement. However, the separation of a liquid mixture using a liquid purge is also possible and, in such a case, the heat exchanger is replaced by a suitable liquid/liquid separator.

The expression 'valves' as used herein is intended to cover any means for controlling flow of fluid, whether liquid or gas, and includes peristaltic devices, pumps and fluidic control devices. In particular, if temperature and pressure conditions permit, we prefer to use valves comprising a flexible tube, e.g. made of a corrosion resistant material which is shut off by the application of external pressure, e.g. by means of a solenoid. This arrangement can be advantageous in that several flexible tubes may be run side by side and may be shut off or opened using a single operating device instead of one such device for each tube. It is also possible to use multiport valves, for example 3-way and 5-way valves, to combine the function of two or more of the individual valves described above. The term 'valve' is therefore used in the specification and claims to mean a single valve function, whether that valve function is carried out by a single valve or as part of the working of a multiport valve. It may also be possible in certain circumstances to combine the function of two valves, e.g. a purge fluid inlet may also serve as an inlet for the fluid mixture to be separated.

We claim:

1. A method of operating a chromatographic apparatus for separating a fluid mixture, which apparatus has a plurality of compartments containing a chromatographic packing, conduit means interconnecting the compartments in at least one closed loop series, an isolating valve in each conduit for isolating each compartment from the remaining compartments, a purge fluid inlet for each compartment having a valve therein and adapted to be coupled to a source of purge fluid, a purge fluid outlet for each compartment having a valve therein, a carrier fluid inlet for each compartment having a valve therein and adapted to be coupled to a source of carrier fluid, a carrier fluid outlet for each compartment having a valve therein, and a fluid mixture inlet for each compartment having a valve therein and adapted to be coupled to a source of a fluid mixture to be separated chromatographically, the method comprising sequentially operating said isolating valves for successively isolating said compartments from the other compartments at least one at a time in one direction around said loop, opening the valves of the purge fluid inlets and the purge fluid outlets of the isolated compartment(s) to allow the purge fluid to pass therethrough at least one at a time, and closing them when the corresponding compartment(s) is/are in communication with said other compartments, operating the valves successively to open in said one direction the valves of the carrier fluid inlets of the compartments and the valves of the carrier fluid outlets of the compartments, the outlet valve which is open at any one time being associated with a compartment which is further in said one direction around the closed loop series from the compartment having the inlet valve thereof open, and operating the valves successively to open in said one direction the fluid mixture inlet valves of the compartments, the compartment the fluid mixture inlet valve of which is open being a compartment through which carrier fluid passes between the open carrier fluid inlet and the open carrier fluid outlet valves, and closing the inlet and outlet valves of the remaining compartments, whereby at any instant during the operation, the compartments the carrier fluid inlet and outlet valves of which are open are being respectively fed with a bled of carrier fluid, and the compartment the fluid mixture inlet valve of which is open is being fed with a fluid mixture to be separated while the isolated compartment(s) is/are being supplied with and bled of purge fluid at least one at a time.

2. A method according to claim 1 in which isolating valves are closed so that, at any instant, parts of the closed loop series are isolated from one another, the isolating valves are closed in sequence around the closed loop series, and the valves in each isolated part are simultaneously operated as defined in claim 1.

3. A method according to claim 2, wherein a component of the fluid mixture separated in one isolated part forms the fluid mixture inlet to another isolated part.

4. A method according to claim 1 which further comprises maintaining at least one compartment at an elevated temperature.

5. A method of operating a chromatographic apparatus for separating a fluid mixture, which apparatus has a plurality of compartments containing a chromatographic packing, conduit means interconnecting the compartments in at least one closed loop series, an isolating valve in each conduit for isolating each compartment from the remaining compartments, a purge fluid inlet for each compartment having a valve therein and adapted to be coupled to a source of purge fluid, a purge fluid outlet for each compartment having a valve therein, a carrier fluid inlet for each compartment having a valve therein and adapted to be coupled to a source of carrier fluid, a carrier fluid outlet for each compartment having a valve therein, and a fluid mixture inlet for each compartment having a valve therein and adapted to be coupled to a source of a fluid mixture to be separated chromatographically, the method comprising sequentially operating said isolating valves for successively isolating said compartments from the other compartments at least one at a time in one direction around said loop, opening the valves of the purge fluid inlets and the purge fluid outlets of the isolated compartment(s) to allow purge fluid to pass therethrough at least one at a time and, closing them when the corresponding compartment(s) is/are in communication with said other compartments, operating the valves successively to open in said one direction the valves of the carrier fluid inlets of the compartments and the valves of the carrier fluid outlets of the compartments, the outlet valve which is open at any one time being associated with the same compartment the inlet valve of which is open, and operating the valves successively to open in said one direction the fluid mixture inlet valves of the compartments, the compartment the fluid mixture inlet valve of which is open being the compartment through which carrier fluid passes between the open carrier fluid inlet and the open carrier fluid outlet valves, and closing the inlet and outlet valves of the remaining compartments, whereby at any instant during the operation, the compartment the carrier fluid inlet and outlet valves of which are open is being respectively fed with and bled of carrier fluid and is being fed with a fluid mixture to be separated while the isolated compartment(s) is/are being supplied with and bled of purge fluid at least one at a time.

* * * * *